United States Patent [19]

Smeltzer

[11] Patent Number: 5,544,419
[45] Date of Patent: Aug. 13, 1996

[54] DIPSTICK ASSEMBLY

[75] Inventor: Sean G. Smeltzer, Youngwood, Pa.

[73] Assignee: Westinghouse Air Brake Company, Wilmerding, Pa.

[21] Appl. No.: 430,233

[22] Filed: Apr. 28, 1995

[51] Int. Cl.⁶ ................................................. G01F 23/04
[52] U.S. Cl. .............................................. 33/731; 33/722
[58] Field of Search ........................... 33/721–731, 717, 33/718

[56] References Cited

U.S. PATENT DOCUMENTS

| | | | |
|---|---|---|---|
| 848,898 | 4/1907 | Gregson | 33/718 |
| 1,501,990 | 7/1924 | Gillet | 33/730 |
| 1,553,915 | 9/1925 | Rix et al. | 33/725 |
| 2,233,325 | 2/1941 | Raines | 33/722 |
| 2,297,850 | 10/1942 | Woolery | 33/730 |
| 2,539,604 | 1/1951 | Woolley | 33/722 |
| 2,757,647 | 8/1956 | Kishiline | 33/727 |
| 3,311,984 | 4/1967 | Stux et al. | 33/729 |
| 3,662,470 | 5/1972 | Sasgen | 33/731 |
| 3,738,176 | 6/1973 | Kerfoot | 33/717 |
| 4,197,744 | 4/1980 | Overstreet | 33/717 |
| 4,651,428 | 3/1987 | Allaria et al. | 33/721 |

FOREIGN PATENT DOCUMENTS

| | | | |
|---|---|---|---|
| 1189597 | 10/1959 | France | 33/718 |
| 512814 | 2/1955 | Italy | 33/722 |

*Primary Examiner*—Thomas B. Will
*Attorney, Agent, or Firm*—James Ray & Associates

[57] ABSTRACT

An improved dipstick assembly is provided for measuring liquid level in a chamber containing liquid and gas in which the liquid may be agitated, and in which the gas may have a pressure different from atmospheric. An example is the oil reservoir or crankcase of a reciprocating apparatus while the apparatus is running. A tube is provided for attachment to an upper portion of the chamber, the tube extending downward into the liquid. A liquid level indicating device is inserted in the tube. A valve is provided at or near the bottom of the tube to close it off when the liquid level measuring device is removed, but which is opened when the device is inserted, so that a reading can be made. The valve prevents loss of liquid through the tube when the measuring device is removed, and prevents gas in the chamber from communicating with the atmosphere. When the measuring device is inserted, a seal at or near its upper end prevents such loss or communication. Various economical and reliable designs are provided for the valve.

11 Claims, 4 Drawing Sheets

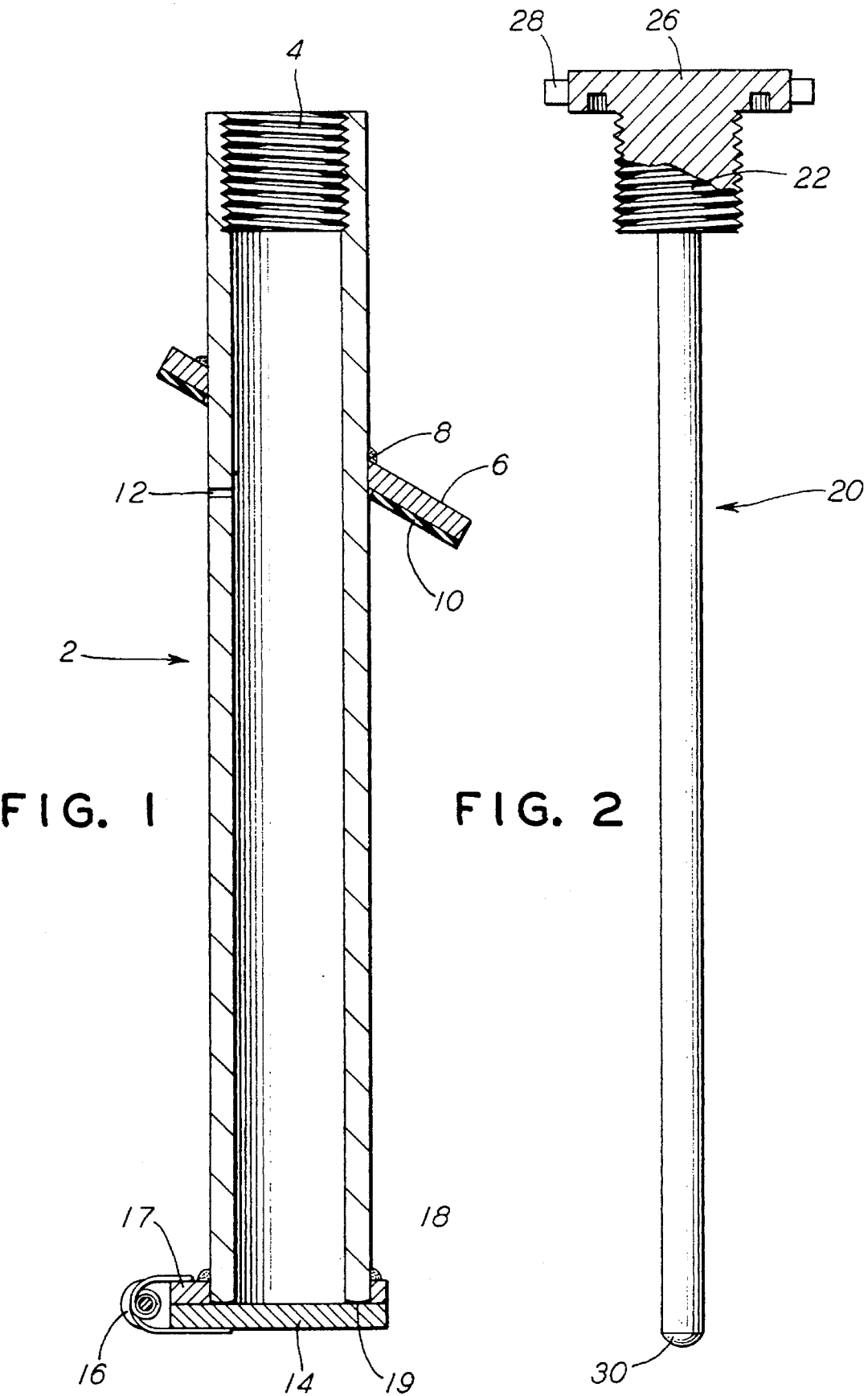

DIPSTICK ASSEMBLY

FIELD OF THE INVENTION

This invention applies to the measurement of liquid level a chamber containing a liquid and a gas, applying particularly to systems in which the liquid is agitated and the gas may be subject to pressure variations, and applying most particularly to the measurement of oil level in the crankcase or oil reservoir of a reciprocating apparatus such as an air compressor or internal combustion engine while the apparatus is

BACKGROUND OF THE INVENTION

Conventional oil level dipsticks having a fluid level indicating rod for insertion into a chamber containing oil such as a crankcase or oil reservoir of a reciprocating apparatus generally require that the apparatus be stopped at the time of the oil reading. This is due to agitation of the oil by the reciprocating apparatus, and variations in the pressure of the air above the oil caused by the reciprocating apparatus. Pressure variations of the air cause air containing oil to be expelled on the positive pressure portions of the cycle of the reciprocating apparatus, and negative variations of the air pressure cause unfiltered air to be drawn into the oil chamber.

U.S. Pat. No. 3,662,470, which issued on May 16, 1972, provides an approach to solving this problem. The teachings this patent are hereby incorporated into the present application by reference thereto.

In the cited patent, a tube is provided for insertion of an oil level indicating rod into the chamber which contains the oil. A ball valve at the lower end of the tube is provided to prevent flow of air and oil between the chamber and the atmosphere. When the oil level indicating rod is inserted, it pushes the ball downward thus opening the ball valve, so that the oil level in the tube equalizes with the oil level in the chamber. A seal is provided between the top end of the tube and a portion of the oil level indicating rod to prevent flow of air and oil when the ball valve is opened by insertion of the oil level indicating rod.

The seal at the top end of the tube consists of compressible sealing means which are compressed when the level indicating rod is fully inserted. To provide a partial seal during brief times when the indicating rod is being inserted or removed, a portion of the rod has a portion on its O.D. threaded like a bolt, and a portion of the tube has a portion on its I.D. threaded like a nut. These fit closely and prevent significant flow of oil and/or air past the rod.

This patent also cites a port in the tube at a high elevation in the chamber. The patent indicates that this serves to prevent undesirable rise of oil above the level of the port. This port also serves to equalize pressure of the air above the oil in the tube and the pressure of the air above the oil in the chamber, so that the oil level in the tube represents the level of oil in the chamber.

This patent, while a major advance over the art which preceded it, has several disadvantages:

(1) It is expensive, requiring the assembly of eleven parts.

(2) The ball valve of this patent requires a moveable sleeve mounted externally to cover a lower portion of the tube. This arrangement has considerable slop or play, and is prone to damage because of its exposed external location.

(3) If servicing is necessary, it is difficult to disassemble and repair.

BRIEF SUMMARY OF THE PRESENT INVENTION

A dipstick assembly is provided for measuring fluid level in a chamber containing a liquid and a gas which may be read even when the liquid is agitated and when the gas may have a pressure differing from atmospheric. The dipstick assembly includes a tube which penetrates the chamber through an opening in the chamber. The tube has means on its outer surface for attachment to the chamber, and sealing means so that gas cannot leak into or out of the chamber through the opening in the chamber, and outside the tube. The attachment means may be a plate welded to the tube, at an angle to match the chamber, and the plate may be curved to match the curvature of the chamber. Sealing may be provided by making the weld a continuous weld around the entire tube, and by placing a compressible layer such as rubber or an elastomer between the plate and the chamber.

The level of the liquid is determined by a liquid level indicating rod which fits inside the tube, and which can be withdrawn for reading the liquid level. A seal is provided between the upper end of the tube and a portion of the indicating rod to provide a seal when the indicating rod is fully inserted into the tube. Partial sealing means are also provided which provide at least a partial seal between a portion of the indicating rod and a portion of the tube over a range of relative elevations between the rod and the tube so at least a partial seal is provided during brief times when the rod is inserted or withdrawn.

A seal is also provided at the lower end of the tube which provides a seal when the rod is removed, and which is opened to permit liquid communication between the chamber and the tube when the rod is inserted in the tube.

Gas pressure equalizing means is provided at a location on the tube intermediate the upper end of the tube and the lower end of the tube to equalize gas pressure between the chamber and the tube.

The sealing means at the lower end of the tube consists of a single moveable member resiliently pressed against a valve seat on the tube when the indicating rod is withdrawn to act as a closure means, but pressed away from the valve seat when the rod is inserted to permit liquid communication between the chamber and the tube.

In a further aspect, the invention provides a dipstick assembly similar to that described above, in which a valve seat is formed at the lower end of the tube, and the closure means at the lower end of the tube is a hinged cover plate which is resiliently mounted to press against the valve seat when the rod is removed, but which is pressed away from the valve seat when the rod is inserted to permit liquid communication between the chamber and the tube.

In a further aspect, the invention provides a dipstick assembly similar to that described above, in which an axisymmetrical valve seat is formed on the tube, at the bottom end of the tube, or near the bottom end of the tube, and an axisymmetrical closure means with resilient mounting means is provided to press against the axisymmetrical valve seat when the rod is removed, and which is pressed away from the axisymmetric valve seat when the rod is inserted to permit liquid communication between the chamber and the tube.

OBJECTS OF THE INVENTION

The principal object of this invention is to provide an apparatus for measuring liquid level in a chamber containing a liquid such as oil, and a gas such as air.

It is an object to provide apparatus to make this measurement possible even if the liquid is agitated and even if the gas is subject to pressure variations.

It is most particularly an object to provide apparatus for this measurement for the oil level in a reciprocating apparatus such as an air compressor or internal combustion engine while the apparatus is running. This would be the case, for example, for the air compressor of a railroad braking system for a train which is in operation.

The previously-mentioned U.S. Pat. No. 3,662,470 provides an approach to this problem, but it has several disadvantages which the present invention overcomes. The system of the cited patent requires the assembly of eleven parts. The present invention has as an object a reduction in the number of parts, and the cost of the assembly. The cited patent is also difficult to disassemble for repair. It is an object to provide a design which is easy to disassemble and repair. A further object, of some of the embodiments of the present invention, is to provide designs in which all the relatively movable parts are contained within parts which are not relatively moveable, thus providing a system which is damage resistant.

An additional object is to provide designs for a dipstick assembly which is sufficiently rugged that no parts will break off and be carried by the agitated oil to the reciprocating parts and cause damage to the apparatus.

In addition to the objects and advantages of the invention cited above, various other objects and advantages will be apparent to one skilled in the art.

BRIEF DESCRIPTION OF THE DRAWINGS

FIG. 1 is a vertical median section of the tube portion of the dipstick assembly for an embodiment in which the sealing means at the bottom end of the tube is a hinged cover plate which is resiliently pressed against the lower end of the tube, which has been formed as a valve seat.

FIG. 2 is a vertical median section of a rod on which the oil level is measured.

BRIEF DESCRIPTION OF THE INVENTION AND PRESENTLY-PREFERRED EMBODIMENTS

Figure 3:
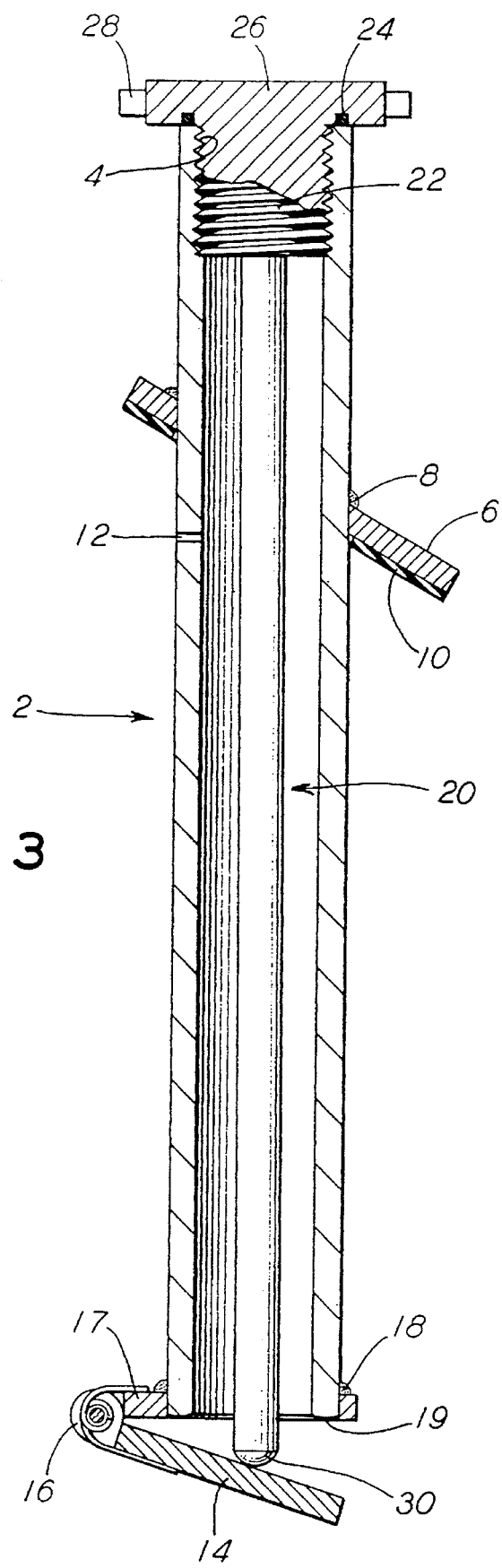
FIG. 3 is a vertical median section of the tube and rod assembled, the rod being inserted in the tube, and in which the rod pushes the hinged cover plate downward so that liquid can flow into the bottom end of the tube.

Prior to proceeding to the more detailed description of the invention, it should be noted that for any one embodiment, shown in more than one figure, identical components have been identified with identical reference numerals.

Now reference is made, more particularly, to the figures. FIG. 1 shows a vertical median section of the tube portion of the dipstick assembly for an embodiment in which the sealing means at the bottom end of the tube is a hinged cover plate which is resiliently pressed against the lower end of the tube.

The tube is generally indicated at 2. It has female threads 4 at its upper end which act as a first portion of a partial seal. Attachment of the tube is accomplished by a plate 6 joined to the tube by weld 8. The weld 8 should go all the way around the tube 2 to prevent gas leakage between the tube 2 and the plate 6. Compressible sealing means 10, such as a rubber gasket, are provided to make a gas-tight seal when the unit is attached to a chamber such as a crankcase or oil reservoir. Holes (not shown) may be provided in the plate 6 for bolting to the crankcase or oil reservoir (not shown). A person skilled in the art will recognize that the compressible sealing means 10 must be made of a material which resists attack by the oil or other liquid which is to be measured.

Figure 5:
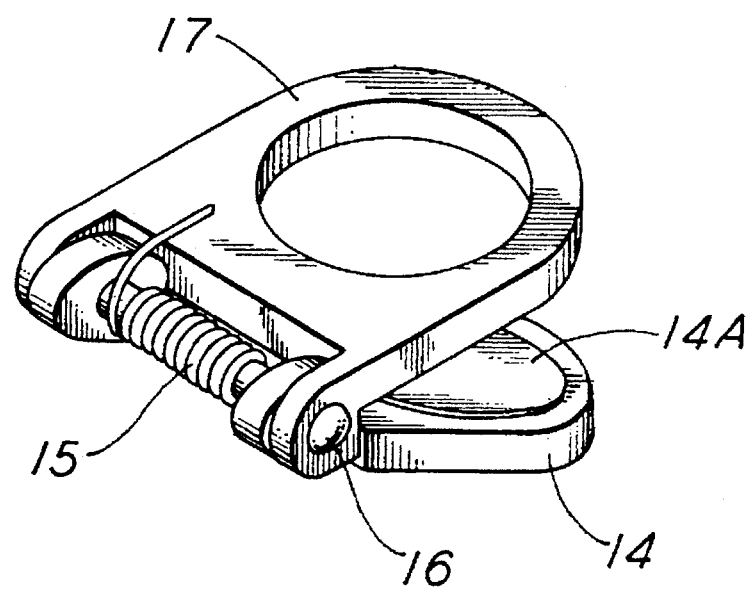
FIG. 5 is a perspective drawing which shows the hinged cover plate as it closes due to the torsional spring.

At the bottom end of the tube 2, a cover plate 14 is attached by hinge 16 to a ring 17, which is joined by weld 18 to the tube. The lower end of the tube 19 is formed as a valve seat for the cover plate 14. The cover plate 14 is pressed against the lower end of the tube 19 by a torsional spring (FIG. 5). To provide a liquid tight seal between the cover plate 14 and the lower end of the tube 16, a compressible sealing means may be interposed therebetween, such as a layer of rubber 14A on the inside surface of the cover plate 14.

A port 12 in the tube 2 acts to equalize gas pressure inside tube 2 and gas pressure in the crankcase or oil reservoir (not shown) adjacent the tube.

A fluid level indicating rod is shown generally at 20. It has male threads 22 which provide a partial seal when engaged with the female threads 4 in FIG. 1. A seal, 24, which may be an O-ring is provided in cap 26 to make a seal when the dipstick is inserted. A protrusion 28 on cap 26 is provided to facilitate tightening and loosening of the rod.

FIG. 3 shows the liquid level indicating rod 20 inserted into the tube 2. The lower end 30 of the indicating rod 20 is shown pressing on the hinged cover plate 14 to permit oil to enter the tube 2 and rise to the same level as in the crankcase or oil reservoir (not shown). It is desirable for the lower end 30 of rod 20 to be rounded to prevent damage to the cover plate 14. It is also desirable for the lower end 19 of tube 2 to be rounded and smoothly finished so it serves as a valve seat for mating with the cover plate 14.

Figure 4:
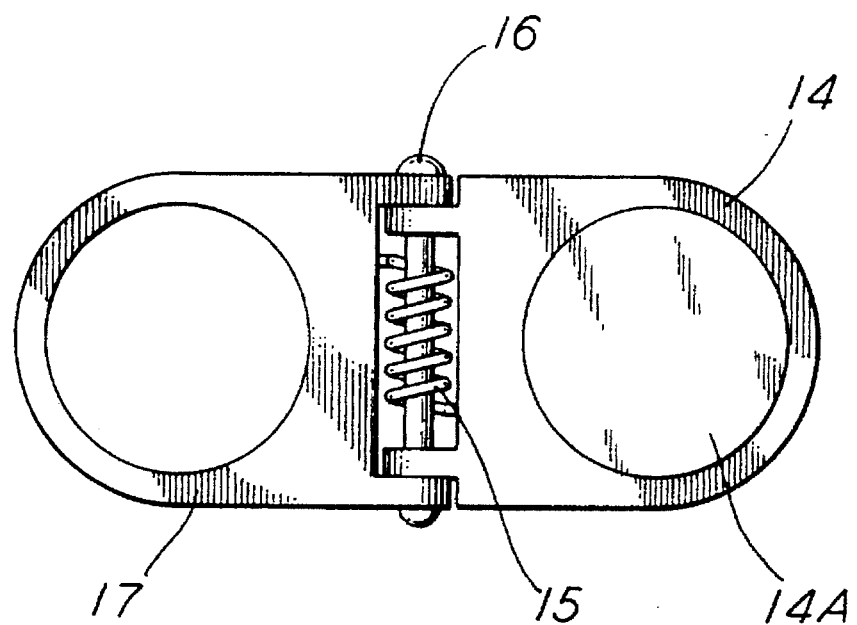
FIG. 4 shows a plan view of the hinged cover plate, laid out for viewing.

FIG. 4 shows the cover plate 14 and the ring 17 spread out for viewing. These are attached through hinge 16, and resiliently loaded by torsional spring 15.

FIG. 5 shows a perspective view of the cover plate and ring showing the effect of the spring which is to press the cover plate 14 onto the ring 17. When the ring 17 is joined by weld 18 to the tube 2, this spring causes the cover plate to press against the lower end 19 of tube 2 when the rod 20 is removed for reading of the liquid level.

Figure 6:
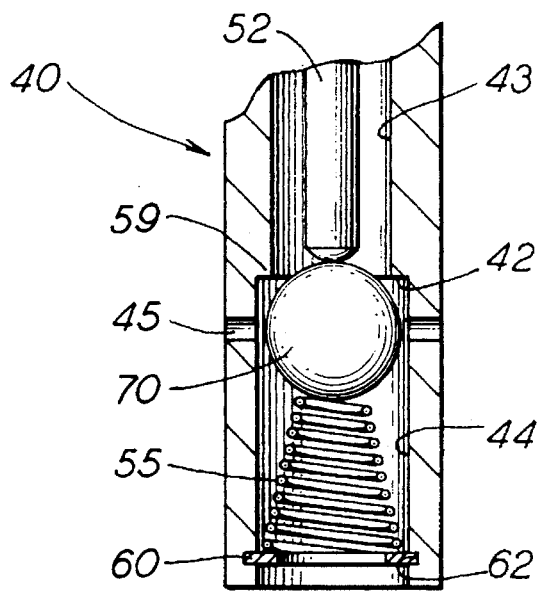
FIG. 6 shows a median section of a presently preferred embodiment in which the closure means is a ball bearing supported on a coil spring supported on an internal snap ring.

FIG. 6 shows a presently preferred embodiment. The lower end of the tube, generally indicated as 40 has a change in inside diameter 42 from diameter 43 above the change to diameter 44 below the change. The outside corner 59 at the change in diameter is cleanly machined to act as a valve seat to engage the ball bearing 50.

The ball bearing 50 is supported on coil spring 55 on snap ring 60 which is engaged with an inside groove 62.

When a dipstick 52 is inserted, it presses the ball 50 downward away from the valve seat 59. One or more ports 45 is provided below the change in inside diameter 42 and above the widest portion of the ball when it is pressed downward by the dipstick 52. This permits oil to enter the tube 40 and rise to the same level as in the surrounding reservoir or crankcase (not shown).

For a specific example of this embodiment, the outside diameter of the lower end of the tube, 40 is ⅝". The inside diameter below the change in diameter 42 is ½", and the size of the ball is ³¹⁄₆₄" in diameter. The dipstick has a square cross section with a width of ¼". One or more flow ports 45 which are ³⁄₁₆ inches in diameter are provided below the change in diameter 42.

The ball is supported on a coil spring which is ¹⁵⁄₃₂" in diameter, and is ¾" long. The spring is supported on an internal snap ring 60, which fits in a groove 62 formed on the inside of the tube at its lower end. It may be desirable to place a washer (not shown) above the snap ring and supported by it, the washer serving to support the spring 55.

Figure 7:
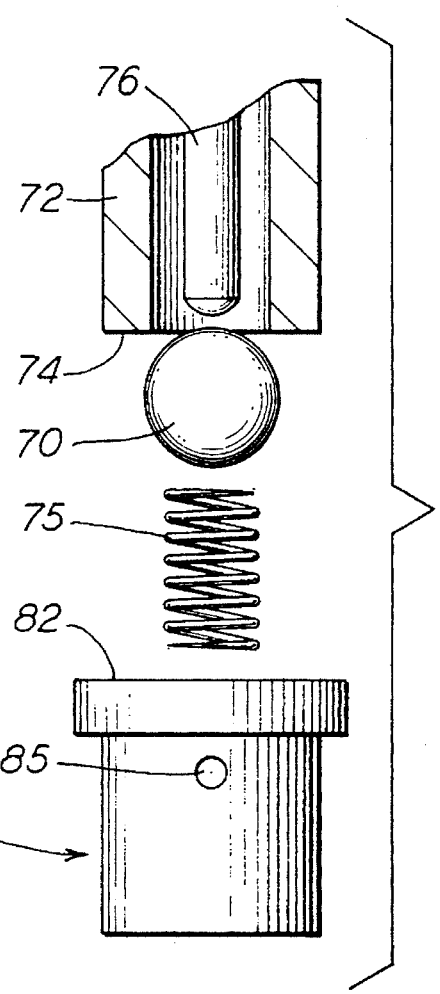
FIG. 7 shows an embodiment similar to that of FIG. 6, except that the coil spring is supported by an end cap.

FIG. 7 shows another presently preferred embodiment. This shows a ball 70 supported on coil spring 75 which is contained in end cap 80 which has fluid port 85. The end cap 80 has a wide portion 82 which fits over the bottom end of the tube 72. A valve seat 74 is formed at the bottom end of the tube 72 for mating with the ball 70 to provide a seal when the indicating rod 76 is withdrawn for reading. As in the preceding embodiment, when the indicating rod 76 is inserted, the ball is pressed downward to permit the liquid being measured to enter the tube 72. A port 85 is provided to admit liquid to the cap 80.

Figure 8:
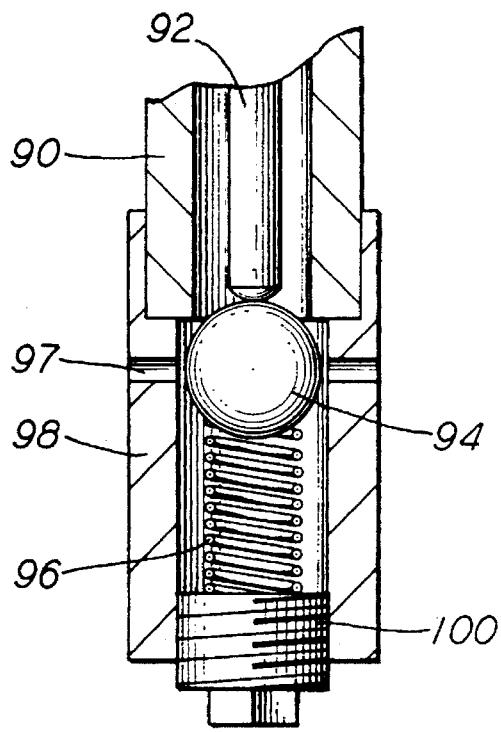
FIG. 8 shows an embodiment in which the end cap is made as a sleeve assembled with an end plug.

FIG. 8 shows an alternative embodiment similar to the preceding embodiment. A sleeve 98 is provided which fits over the bottom end of the tube 90. The lower end of sleeve 98 is closed by plug 100. A ball bearing 94 is supported by coil spring 96 to engage the bottom end of the tube 90. This ball is pressed downward to admit liquid to the tube when the indicating rod 92 is inserted. A liquid port 97 is provided to admit liquid to the inside of the sleeve 98.

Attention is now turned to the invention viewed in more general terms. A dipstick assembly is provided for measuring fluid level in a chamber containing a liquid and a gas which may be read even when the liquid is agitated and when the gas may have a pressure differing from atmospheric. The dipstick assembly includes a tube which penetrates the chamber through an opening in the chamber. The tube has means on its outer surface for attachment to the chamber, and sealing means so that gas cannot leak into or out of the chamber through the opening in the chamber, and outside the tube. The attachment means may be a plate welded to the tube, at an angle to match the chamber, and the plate may be curved to match the curvature of the chamber. Sealing may be provided by making the weld a continuous weld around the entire tube, and by placing a compressible layer such as rubber or an elastomer between the plate and the chamber.

The level of the liquid is determined by a liquid level indicating rod which fits inside the tube, and which can be withdrawn for reading the liquid level. A seal is provided between the upper end of the tube and a portion of the indicating rod to provide a seal when the indicating rod is fully inserted into the tube. Partial sealing means are also provided which provide at least a partial seal between a portion of the indicating rod and a portion of the tube over a range of relative elevations between the rod and the tube so at least a partial seal is provided during brief times when the rod is inserted or withdrawn. One design for the partial sealing means is close-fitting mating threads on a portion of the indicating rod and a portion on the I.D. of the tube. The portion on the rod would have threads like a bolt, and the portion on the I.D. of the tube would have threads like a nut. Threads as on nuts and bolts should be used rather than pipe threads because pipe threads are tapered, and would not provide a good partial seal over a significant range of relative elevations.

A seal is also provided at the lower end of the tube which provides a seal when the rod is removed, and which is opened to permit liquid communication between the chamber and the tube when the rod is inserted in the tube.

Gas pressure equalizing means are provided at a location on the tube intermediate the upper end of the tube and the lower end of the tube to equalize gas pressure between the chamber and the tube. This may be a port formed through the wall of the tube to permit gas communication between the chamber and the tube. The diameter of this port should be much smaller than the inside diameter of the tube because when the indicating rod is removed, some gas interchange occurs through this port.

The sealing means at the lower end of the tube consists of a single moveable member resiliently pressed against a valve seat on the tube when the indicating rod is withdrawn to act as a closure means, but pressed away from the valve seat when the rod is inserted to permit liquid communication between the chamber and the tube.

It is desirable for the rod to have indicating marks for indicating the level of the liquid. For an oil level indicating means, marks on the rod indicating low and high oil level may be provided.

In a second aspect, the invention provides a dipstick assembly similar to the above, in which the tube is attached to the chamber by a plate welded to the outer surface of the tube. The plate may be attached to the chamber by screws. Clearance holes would be provided in the plate, and threaded holes would be provided at adjacent locations in the chamber. The plate may have a curvature matching that of the chamber, and may be attached to the tube at an oblique angle, to match the angle of the chamber.

In a further aspect, a gas-tight seal between the tube and the plate may be provided by attaching the plate by a weld passing around the entire circumference of the tube.

In yet a further aspect, a gas tight seal between the attachment means and the chamber may be provided by a compressible layer placed between the attachment means and the chamber. Rubber or an elastomer may be used for this compressible layer. One skilled in the art will recognize that the material used for the compressible layer should resist attack by the liquid in the chamber.

In another aspect, a dipstick assembly is provided for measuring fluid level in a chamber containing a liquid and a gas which may be read even when the liquid is agitated and when the gas may have a pressure differing from atmospheric. The dipstick assembly includes a tube which penetrates the chamber through an opening in the chamber. The tube has means on its outer surface for attachment to the chamber, and sealing means so that gas cannot leak into or out of the chamber through the opening in the chamber, and outside the tube. The attachment means may be a plate welded to the tube, at an angle to match the chamber, and the plate may be curved to match the curvature of the chamber. Sealing may be provided by making the weld a continuous weld around the entire tube, and by placing a compressible layer such as rubber or an elastomer between the plate and the chamber.

The level of the liquid is determined by a liquid level indicating rod which fits inside the tube, and which can be withdrawn for reading the liquid level. A seal is provided between the upper end of the tube and a portion of the indicating rod to provide a seal when the indicating rod is fully inserted into the tube. Partial sealing means are also provided which provide at least a partial seal between a portion of the indicating rod and a portion of the tube over a range of relative elevations between the rod and the tube so at least a partial seal is provided during brief times when the rod is inserted or withdrawn. One design for the partial sealing means is close-fitting mating threads on a portion of the indicating rod and a portion on the I.D. of the tube. The portion on the rod would have threads like a bolt, and the portion on the I.D. of the tube would have threads like a nut. Threads as on nuts and bolts should be used rather than pipe threads because pipe threads are tapered, and would not provide a good partial seal over a significant range of relative elevations.

A seal is also provided at the lower end of the tube which provides a seal when the rod is removed, and which is opened to permit liquid communication between the chamber and the tube when the rod is inserted in the tube.

Gas pressure equalizing means are provided at a location on the tube intermediate the upper end of the tube and the lower end of the tube to equalize gas pressure between the chamber and the tube. This may be a port formed through the wall of the tube to permit gas communication between the chamber and the tube. The diameter of this port should be much smaller than the inside diameter of the tube because when the indicating rod is removed, some gas interchange occurs through this port.

Gas pressure equalizing means are provided at a location on the tube intermediate the upper end of the tube and the lower end of the tube to equalize gas pressure between the chamber and the tube. This may be a port formed through the wall of the tube to permit gas communication between the chamber and the tube. The diameter of this port should be much smaller than the inside diameter of the tube because when the indicating rod is removed, some gas interchange occurs through this port.

The sealing means at the lower end of the tube consists of a hinged cover which is resiliently mounted to press against the bottom end of the tube but pressed away from the tube when the rod is inserted to permit liquid communication between the chamber and the tube. The lower end of the tube should be rounded and smoothed to act as a valve seat to make a good fit with the hinged cover.

In a further aspect, compressible sealing means may be provided to improve the seal between the hinged cover and the bottom end of the tube. The compressible sealing means may be a layer of rubber or elastomer mounted on the cover plate.

In another aspect, a dipstick assembly is provided for measuring fluid level in a chamber containing a liquid and a gas which may be read even when the liquid is agitated and when the gas may have a pressure differing from atmospheric. The dipstick assembly includes a tube which penetrates the chamber through an opening in the chamber. The tube has means on its outer surface for attachment to the chamber, and sealing means so that gas cannot leak into or out of the chamber through the opening in the chamber, and outside the tube. The attachment means may be a plate welded to the tube, at an angle to match the chamber, and the plate may be curved to match the curvature of the chamber. Sealing may be provided by making the weld a continuous weld around the entire tube, and by placing a compressible layer such as rubber or an elastomer between the plate and the chamber.

The level of the liquid is determined by a liquid level indicating rod which fits inside the tube, and which can be withdrawn for reading the liquid level. A seal is provided between the upper end of the tube and a portion of the indicating rod to provide a seal when the indicating rod is fully inserted into the tube. Partial sealing means are also provided which provide at least a partial seal between a portion of the indicating rod and a portion of the tube over a range of relative elevations between the rod and the tube so at least a partial seal is provided during brief times when the rod is inserted or withdrawn. One design for the partial sealing means is close-fitting mating threads on a portion of the indicating rod and a portion on the I.D. of the tube. The portion on the rod would have threads like a bolt, and the portion on the I.D. of the tube would have threads like a nut. Threads as on nuts and bolts should be used rather than pipe threads because pipe threads are tapered, and would not provide a good partial seal over a significant range of relative elevations.

A seal is also provided at the lower end of the tube which provides a seal when the rod is removed, and which is opened to permit liquid communication between the chamber and the tube when the rod is inserted in the tube.

Gas pressure equalizing means are provided at a location on the tube intermediate the upper end of the tube and the lower end of the tube to equalize gas pressure between the chamber and the tube. This may be a port formed through the wall of the tube to permit gas communication between the chamber and the tube. The diameter of this port should be much smaller than the inside diameter of the tube because when the indicating rod is removed, some gas interchange occurs through this port.

The seal at the lower end of the tube includes of a valve seat which may be formed at the bottom end of the tube, or may be formed at an elevation above the bottom, at a change in inside diameter from a relatively small inside diameter above the elevation of the diameter change, to a relatively large inside diameter below the change. Closure is accomplished by an axisymmetrical member which is mounted on a spring to press against the valve seat when the indicating rod is not present, but which is pressed downward, away from the valve seat, when the rod is inserted.

In a further aspect, the axisymmetrical closure means has an axial dimension and a maximum diameter, the axial dimension exceeding the maximum diameter.

In a further aspect, the axisymmetrical closure means is a ball bearing.

In a further aspect, the valve seat is formed at a change in inside diameter of the tube, the ball is contained in the tube below the diameter change, and the resilient mounting means is a coil spring likewise contained in the tube, underneath the ball.

In a further aspect, the spring which supports the ball is itself supported on an internal snap ring which fits inside a groove at the I.D. of the tube at its lower end. It may be desirable to place a washer on top of the snap ring to support the spring.

In yet another aspect, one or more ports may be provided below the change in diameter to provide fluid communication between the tube and the chamber when the ball or other axisymmetrical closure means is pressed downward by the indicating rod.

In a further aspect, the valve seat may be formed on the lower end of the tube, and a cap is provided which fits over the lower end of the tube, the axisymmetrical closure means and resilient mounting means being contained in the cap.

In a further aspect, the cap may be attached to the tube by means which include threads formed on the outer surface of the tube at its lower end, and threads formed on the inside surface of the cap.

To provide increased assurance that the cap will not fall off and cause damage to the apparatus, its attachment means may include welding to the tube.

In another aspect, the cap may be formed as a sleeve which fits over the lower end of the tube, the sleeve being closed at its lower end by a plug.

In another aspect, the plug may be secured to the sleeve by welding to the sleeve.

In another aspect, the sleeve may be secured by welding to the outer surface of the tube.

While a number of specific embodiments of the invention have been presented here, it will be apparent to one skilled in the art that various other modifications and adaptations of the invention can be made by persons skilled in the art without departing from the spirit and scope of the appended claims.

I claim:

1. An improved dipstick assembly for measuring a liquid level in a chamber containing both a liquid and a gas which may be measured even when such liquid is agitated and when such gas may have a pressure differing from atmospheric, said improved dipstick assembly comprising:

(a) a tube having a first predetermined length insertable into an interior portion of such chamber and a second predetermined length thereof which will extend outwardly from an opening provided through a wall portion of such chamber which will receive said tube therein, said tube having an upper end, a lower end, an inside surface, an outside surface and a predetermined cross sectional shape;

(b) an attachment means engageable with said outer surface of said tube at a predetermined distance from said upper end thereof and with an outer surface of such wall portion of such chamber for attaching said tube to such chamber adjacent such opening and in a position such that said lower end of said tube extends into such liquid at a point which is a lowest level of such liquid to be measured;

(c) a first sealing means engageable with such outer surface of such wall portion adjacent such opening and with at least one of said outer surface of said tube adjacent an inner surface of said attachment means and said inner surface of said attachment means for providing a gas-tight seal of said dipstick assembly to such chamber;

(d) a liquid level indicating means having an upper end, a lower end and a predetermined cross sectional shape, a major portion of said indicating means being insertable within said tube for indicating a level of such liquid contained within such chamber;

(e) a first portion of a second sealing means disposed on said inner surface of said tube adjacent said upper end thereof and a second portion of said second sealing means disposed on said indicating means adjacent said upper end thereof for providing at least a partial seal between said indicating means and said tube over a predetermined range of relative elevations between said indicating means and said tube as said indicating means is being withdrawn from said tube;

(f) a third sealing means disposed adjacent said upper end of said indicating means for providing a seal between said indicating means and said tube when said indicating means is fully inserted into said tube;

(g) a valve seat formed on said lower end of said tube;

(h) a fourth sealing means disposed adjacent said lower end of said tube and having a single movable member resiliently pressed against said valve seat on said tube for sealing said tube when said indicating means is withdrawn and for permitting liquid communication between such chamber and said tube when said single movable member is pressed away from said valve seat by insertion of said indicating means into said tube; and (i) a gas pressure equalization means formed through a wall portion of said tube at a predetermined position on said tube adjacent such gas in such chamber for equalizing gas pressure between such chamber and said tube;

said fourth sealing means having a hinged cover plate resiliently mounted to said lower end of said tube and adapted to press against said valve seat when said indicating rod is withdrawn, but pressed away from said valve seat when said rod is inserted to permit liquid communication between such chamber and said tube.

2. A dipstick assembly, according to claim 1, wherein said hinged cover plate has a compressible sealing means for providing a liquid tight seal between said hinged cover plate and said valve seat.

3. An improved dipstick assembly for measuring a liquid level in a chamber containing both a liquid and a gas which may be measured even when such liquid is agitated and when such gas may have a pressure differing from atmospheric, said improved dipstick assembly comprising:

(a) a tube having a predetermined length insertable into an interior portion of such chamber and extending from an opening provided through a wall portion of such chamber which will receive said tube therein, said tube having an upper end, a lower end, an outside surface and an inside surface, said inside surface having a first predetermined inside diameter at its upper end, and a second predetermined inside diameter at it lower end sufficiently larger than said first predetermined inside diameter to provide an annular valve seat where said first predetermined inside diameter extends from said second predetermined inside diameter;

(b) an attachment means engageable with said outer surface of said tube at a predetermined distance from said upper end thereof and with an outer surface of such wall portion of such chamber for attaching said tube to such chamber adjacent such opening and in a position such that said lower end of said tube extends into such liquid at a point which is a lowest level of such liquid to be measured;

(c) a first sealing means engageable with such outer surface of such wall portion adjacent such opening and with at least one of said outer surface of said tube adjacent an inner surface of said attachment means and said inner surface of said attachment means for providing a gas-tight seal of said dipstick assembly to such chamber;

(d) a liquid level indicating means having an upper end, a lower end and a predetermined cross sectional shape, a major portion of said indicating means being insertable within said tube for indicating a level of such liquid contained within such chamber;

(e) a first portion of a second sealing means disposed on said inner surface of said tube adjacent said upper end thereof and a second portion of said second sealing means disposed on said indicating means adjacent said upper end thereof for providing at least a partial seal between said indicating means and said tube over a predetermined range of relative elevations between said indicating means and said tube as said indicating means is being withdrawn from said tube;

(f) a third sealing means disposed adjacent said upper end of said indicating means for providing a seal between said indicating means and said tube when said indicating means is fully inserted into said tube;

(g) a fourth sealing means disposed adjacent said lower end of said tube and having a single movable member resiliently pressed against said valve seat on said tube for sealing said tube when said indicating means is withdrawn and for permitting liquid communication between such chamber and said tube when said single movable member is pressed away from said valve seat by insertion of said indicating means into said tube, said fourth sealing means including;

(i) a ball valve having a diameter greater than said first predetermined inside diameter of said tube and less than said second inside diameter of said tube, disposed within said lower end of said tube and adapted for reciprocal motion within said lower end of said tube;

(ii) a compression spring secured within said lower end of said tube under said ball valve adapted to bias said ball valve upwardly against said annular valve seat when said liquid level indicating mens is withdrawn from said tube; and (iii) a liquid flow port through said lower end of said tube adapted to permit liquid communication between such chamber and said upper end of said tube when said ball valve is pressed away from said valve seat; and (i) a gas pressure equalization means formed through a wall portion of said tube at a predetermined position on said tube adjacent such gas in such chamber for equalizing gas pressure between such chamber and said tube.

4. A dipstick assembly, according to claim 3, in which said compression spring is compressed in place between said ball valve and a retaining means secured at a base of said lower end of said tube.

5. A dipstick assembly, according to claim 4, in which said retaining means comprises an internal snap ring fitted into a groove formed in said base of said lower end of said tube.

6. A dipstick assembly, according to claim 3, in which said lower end of said tube having said second predetermined inside diameter is formed by a cap attached to said tube having said first predetermined diameter.

7. A dipstick assembly according to claim 6 wherein said cap is affixed to said tube by means which includes threads formed on said outer surface of said tube at its lower end, and threads formed on said inner surface of said cap for engagement with said threads on said tube.

8. A dipstick assembly according to claim 6 wherein said cap is secured to said tube by means which includes welding said cap to said outer surface of said tube.

9. A dipstick assembly according to claim 6 wherein said cap is formed as a sleeve member fitting over said lower end of said tube, said sleeve member being closed at its lower end by a plug.

10. A dipstick assembly according to claim 9 wherein said plug is secured to said sleeve by means which includes welding.

11. A dipstick assembly according to claim 9 wherein said sleeve is secured by means which includes welding to said outer surface of said tube.

* * * * *

UNITED STATES PATENT AND TRADEMARK OFFICE
CERTIFICATE OF CORRECTION

PATENT NO. : 5,544,419
DATED : August 13, 1996
INVENTOR(S) : Sean G. Smeltzer

It is certified that error appears in the above-indentified patent and that said Letters Patent is hereby corrected as shown below:

Column 1, line 12, after is, insert --running.--.

Column 10, line 38, delete "it" and insert --its--.

Column 11, line 28, delete "mens" and insert --means--.

Signed and Sealed this

Fifth Day of November, 1996

*Attest:*

BRUCE LEHMAN

*Attesting Officer*     *Commissioner of Patents and Trademarks*